US012587527B1

(12) United States Patent
Sanchez et al.

(10) Patent No.: US 12,587,527 B1
(45) Date of Patent: *Mar. 24, 2026

(54) SECONDARY DEVICE AUDIO SIGNAL DETECTION AUTHENTICATION METHOD AND SYSTEM

(71) Applicant: UIPCO, LLC, San Antonio, TX (US)

(72) Inventors: Christine Danielle Sanchez, San Antonio, TX (US); Oscar Roberto Tijerina, San Antonio, TX (US); Gerald John Wright, San Antonio, TX (US); Melisa Izaguirre, Boerne, TX (US); Tujwanda LaDonna Trail, San Antonio, TX (US); Ruthie D. Lyle, Durham, NC (US); Snehal Desai, Richardson, TX (US); David Joaquin Harris, San Antonio, TX (US); Eric David Schroeder, San Antonio, TX (US); Jeffrey David Calusinski, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 69 days.

This patent is subject to a terminal disclaimer.

(21) Appl. No.: 18/621,618

(22) Filed: Mar. 29, 2024

Related U.S. Application Data

(63) Continuation-in-part of application No. 17/822,446, filed on Aug. 26, 2022, now Pat. No. 12,259,957.

(Continued)

(51) Int. Cl.
| | |
|---|---|
| *H04L 9/40* | (2022.01) |
| *G06F 21/31* | (2013.01) |
| *G06F 21/32* | (2013.01) |

(52) U.S. Cl.
CPC .......... *H04L 63/0861* (2013.01); *G06F 21/31* (2013.01); *G06F 21/32* (2013.01); *H04L 63/10* (2013.01)

(58) Field of Classification Search
CPC ..... H04L 63/0861; H04L 63/10; G06F 21/31; G06F 21/32
See application file for complete search history.

(56) References Cited

U.S. PATENT DOCUMENTS

| | | | | |
|---|---|---|---|---|
| 2014/0310739 | A1* | 10/2014 | Ricci ..................... | G06V 20/593 |
| | | | | 725/75 |
| 2016/0241555 | A1* | 8/2016 | Vo ......................... | G06F 3/0482 |

(Continued)

OTHER PUBLICATIONS

Notice of Allowance mailed on Nov. 18, 2024 for U.S. Appl. No. 17/822,446.

(Continued)

*Primary Examiner* — Cheng-Feng Huang
(74) *Attorney, Agent, or Firm* — Plumsea Law Group, LLC

(57) ABSTRACT

An audio signal-based method and system of authentication of a person in order to permit access to a secured resource. The system and method are configured to cause an audio sample to be produced by the computing device where a request for access is made. A secondary device on which a verification software application is installed can detect the playback of the audio sample. The secondary device can communicate with the authentication system to confirm detection of the audio sample. In response, the system can determine the user identity is verified, and can further be configured to automatically grant the person access to one or more services, features, or information for which he or she is authorized.

20 Claims, 8 Drawing Sheets

Related U.S. Application Data

(60) Provisional application No. 63/239,036, filed on Aug. 31, 2021.

(56) References Cited

U.S. PATENT DOCUMENTS

| | | | | |
|---|---|---|---|---|
| 2018/0096302 A1* | 4/2018 | Tseretopoulos | ......... | H04L 63/08 |
| 2018/0316389 A1* | 11/2018 | Belk | .................. | H04N 21/4753 |
| 2020/0411014 A1* | 12/2020 | Asher | ..................... | G10L 17/04 |
| 2021/0112098 A1* | 4/2021 | Lillie | ..................... | H04L 63/18 |
| 2022/0029981 A1* | 1/2022 | Mavani | ................... | G06F 9/453 |
| 2022/0036904 A1* | 2/2022 | Traynor | ................. | G10L 25/51 |

OTHER PUBLICATIONS

Non-Final Office Action mailed on Aug. 8, 2024 for U.S. Appl. No. 17/822,446.

* cited by examiner

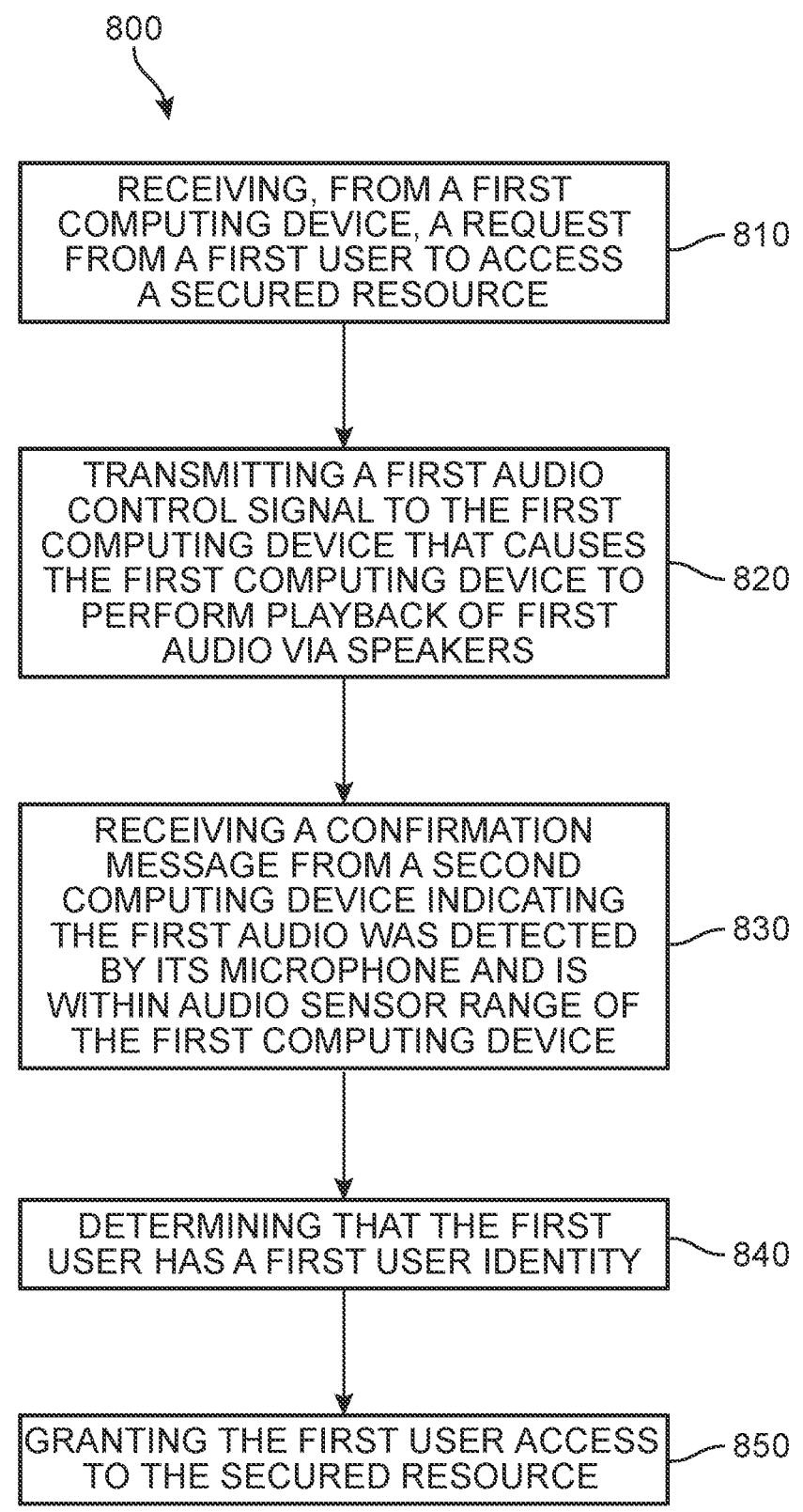

800

RECEIVING, FROM A FIRST COMPUTING DEVICE, A REQUEST FROM A FIRST USER TO ACCESS A SECURED RESOURCE — 810

TRANSMITTING A FIRST AUDIO CONTROL SIGNAL TO THE FIRST COMPUTING DEVICE THAT CAUSES THE FIRST COMPUTING DEVICE TO PERFORM PLAYBACK OF FIRST AUDIO VIA SPEAKERS — 820

RECEIVING A CONFIRMATION MESSAGE FROM A SECOND COMPUTING DEVICE INDICATING THE FIRST AUDIO WAS DETECTED BY ITS MICROPHONE AND IS WITHIN AUDIO SENSOR RANGE OF THE FIRST COMPUTING DEVICE — 830

DETERMINING THAT THE FIRST USER HAS A FIRST USER IDENTITY — 840

GRANTING THE FIRST USER ACCESS TO THE SECURED RESOURCE — 850

FIG. 8

SECONDARY DEVICE AUDIO SIGNAL DETECTION AUTHENTICATION METHOD AND SYSTEM

CROSS-REFERENCE TO RELATED APPLICATIONS

This application is a continuation-in-part of and claims the benefit of U.S. Provisional Patent Application Ser. No. 63/239,036 filed on Aug. 31, 2021 and titled "Audio Feed-back-Based Video Authentication Method and System", and U.S. patent application Ser. No. 17/822,446 filed on Aug. 26, 2022 and titled "Audio Feedback-Based Video Authentication Method and System", the disclosures of which are incorporated by reference herein in their entirety.

TECHNICAL FIELD

The present disclosure generally relates to identity authentication, and specifically to a method and system for authentication of persons seeking access to one or more secured services, features, and resources. The authentication is based on generation of an audio signal by a first device that can be detected by a second device and used to verify the user's identity.

BACKGROUND

Organizations may provide authorized end-users with various secured services or resources via multiple communication channels. Examples of such channels include modes of communication (e.g., a communications network) for exchanging data between devices, where such devices may include, but are not limited to, computing devices, such as tablets, personal computers, and smartphones; point of sale devices; ATMs; connected smart devices, such as refrigerators, watches, and laptops; telephones, such as landline telephones or mobile phones; electronically locked spaces managed by computer user interfaces, such as safe deposit box chambers, lockers, cars, offices, homes; and face-to-face contacts, such as interaction between a user and an employee of the organization. Channels may also include software and firmware associated with the devices and communications devices, such as web portals, applications, networks, mobile applications, and instant messaging systems. Channels may also include hardware associated with the computing devices and telephones, such as the network hardware, credit card scanners, and retinal scanners.

In most scenarios in which an end-user attempts to access a secured resource via one or more of these channels, the end-user will be required to provide some proof of identity, typically associated with an identification card, key-card, fingerprint, or other factor before access is granted. Personal computers (computing devices) pose additional complexities in authenticating users. Computing devices are commonly used by more than one person. It is generally not safe to assume that the identity of the computing device satisfies the ownership factor. Additionally, computing devices have been more easily compromised than other devices. Current solutions increase security, but are often inconvenient for users. More recently, the threat of video forgery (e.g., deep fakes) have increased concern that image data of an end-user may not be authentic.

Thus, authentication (i.e., identifying and verifying) of an end-user can be time-consuming for both the end-user and the organization, as well as burdensome for users who are required to carry and present the necessary identification credentials and/or keys, or memorization of passwords or codes. It may be appreciated that many businesses and other organizations would benefit from mechanisms by which to reduce the costs associated with the authentication and authorization of customers. Furthermore, customers will be attracted by an authentication system that reduces or even eliminates the need to carry or remember multiple unique identification factors, as well as a system that significantly improves account security.

There is a need in the art for a system and method that addresses the shortcomings discussed above.

SUMMARY

In one aspect, a method of authenticating a user seeking access to secured resources is disclosed. The method includes a first step of receiving, at a cloud-based authentication system and from a first user via a first computing device, a request to access a secured resource linked to a first user identity. The method also includes a second step of transmitting, from the authentication system and in response to the request, a first audio control signal to the first computing device, the first audio control signal causing the first computing device to perform playback of first audio data via speakers of the first computing device. A third step includes receiving, at the authentication system, a confirmation message from a second computing device within audio sensor range of the first computing device, the confirmation message indicating the first audio data was detected by a microphone of the second computing device. Furthermore, a fourth step includes determining, in response to the receiving the confirmation message, that the first user has the first user identity. Finally, a fifth step includes thereby granting access to the first user to the secured resource at the first computing device.

In another aspect, a method for precluding attempts by persons to fraudulently obtain access to secure user data is disclosed. The method includes a first step of receiving, at a cloud-based authentication system and from a first user via a first computing device, a request to access a secured resource linked to a first user identity, thereby triggering a first authentication process, and a second step of transmitting, from the authentication system and in response to the request, a first audio control signal to the first computing device, the first audio control signal causing the first computing device to perform playback of first audio data via speakers of the first computing device. The method can include a third step of receiving, at the authentication system, a first confirmation message from a second computing device within audio sensor range of the first computing device, the first confirmation message indicating the first audio data was detected by a first microphone of the second computing device, and a fourth step of receiving, at the authentication system, a second confirmation message from a third computing device within audio sensor range of the first computing device, the second confirmation message indicating the first audio data was detected by a second microphone of the third computing device. A fifth step includes determining, in response to the receiving more than one confirmation message at the authentication system, that an alternate authentication process must be employed to verify whether the first user has the first user identity, and a sixth step includes requiring, at the first computing device, that the first user either move to a private space or present a non-audio-based authentication token in order to access the secured resource via the first computing device.

In another aspect, a system for authenticating a user seeking access to secured resources includes a processor and machine-readable media including instructions which, when executed by the processor, cause the processor to: (1) receive, at a cloud-based authentication system and from a first user via a first computing device, a request to access a secured resource linked to a first user identity; (2) transmit, from the authentication system and in response to the request, a first audio control signal to the first computing device, the first audio control signal causing the first computing device to perform playback of first audio data via speakers of the first computing device; (3) receive, at the authentication system, a confirmation message from a second computing device within audio sensor range of the first computing device, the confirmation message indicating the first audio data was detected by a microphone of the second computing device; (4) determine, in response to the receiving the confirmation message, that the first user has the first user identity; and (5) thereby grant access to the first user to the secured resource at the first computing device.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

FIG. 8 is a flow chart depicting a process of authenticating a user seeking access to secured resources, according to an embodiment.

DETAILED DESCRIPTION

Figure 1:
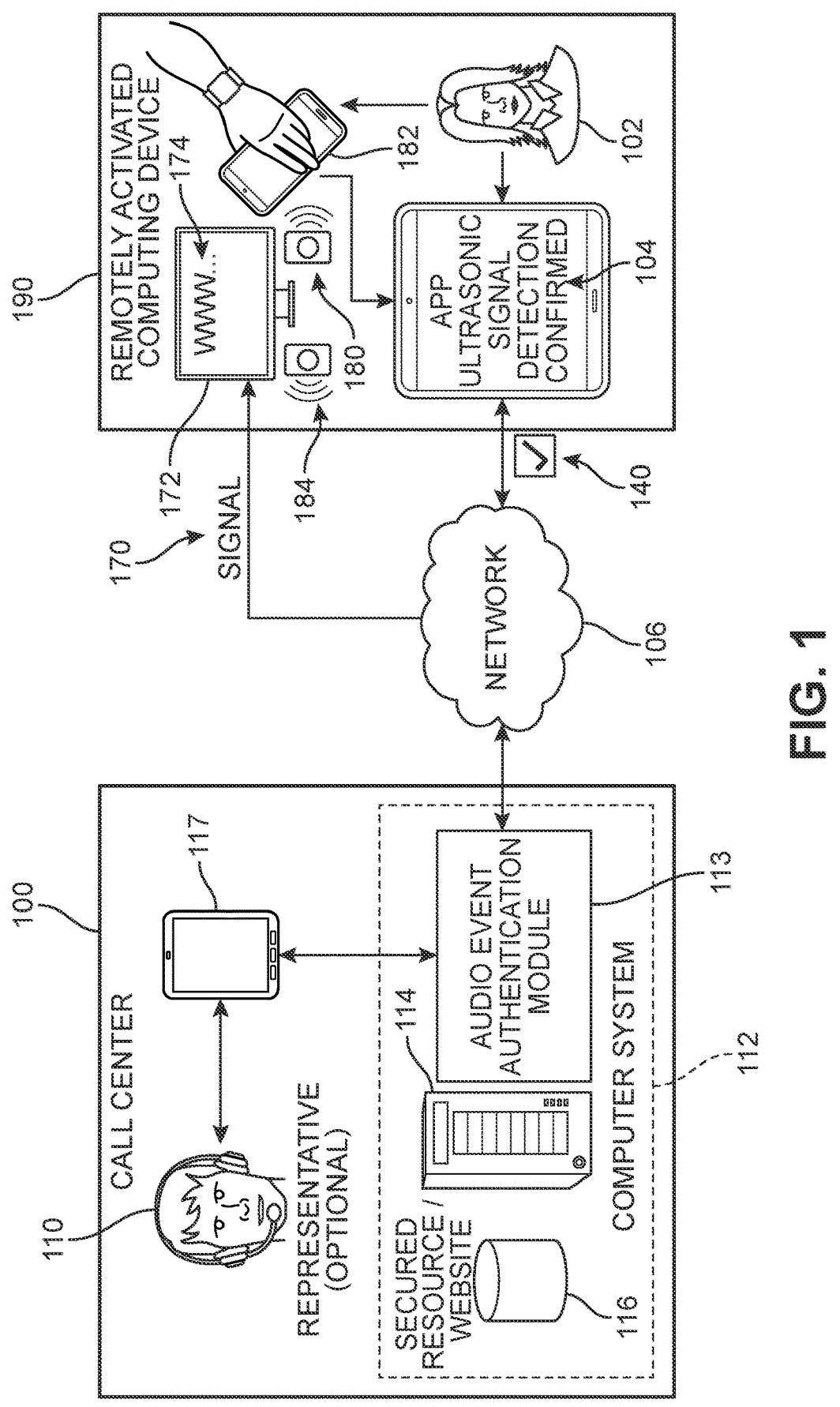
FIG. 1 is an overview of a scenario in which an audio signal is detected by a secondary device as part of an authentication event, according to an embodiment.

The embodiments provide a method and system of authenticating users in a more secure and more efficient manner using remote signaling of user devices. As described in greater detail below, an authentication process and system based on remotely triggered verification signals via a nearby device on which a verification application is installed may be utilized for reducing and in some cases eliminating the need for users to present credentials, input passwords, or otherwise offer identity tokens or factors, as well as curtail fraudulent attempts to access secured resources such as a user's private account. The proposed system takes advantage of the increasing reliance on teleconferencing and the growing availability of speakers and microphones and smart devices in the day-to-day life of the modern consumer. More specifically, the system contemplates the generation of an audio signal from a first computing device ("primary device") that can be detected by a user's mobile computing device ("secondary device"). This can occur, for example, during a video session with a customer representative, or in response to a log-in attempt by a person to some secured resource via the primary device. In some cases, a service representative may manually initiate the transmission of the audio signal. By triggering the generation of audio from the primary computing device in the user's environment, and then detecting that audio information through the user's own mobile device, user service sessions can be securely authenticated by confirming the user's identity. The sounds emitted by the primary device can represent a type of audio-based security token for the user. In one example, such authentication can be performed by confirming that the sound(s) generated by the system and captured by the mobile device are a match.

As will be described in greater detail below, in different embodiments, the system can employ a unique, randomly generated audio signal to authenticate a user session. For example, each time a person accesses a website or other secured online portal/site via the primary device, the website can initiate a check that determines whether the primary computer's speakers have been enabled or not muted. If the speakers are available and enabled, the website can send a "proceed", "continue", or "go" message to the access management system, which will then responsively generate a unique, randomly generated audio signal. In one embodiment, this audio signal would be inaudible to the human ear, for example, a signal carrying an audio sample of a frequency above 20,000 Hz. An authentic user would know that their secondary device should have the verification application already installed and connected to their account. The secondary device should be near enough to the speakers of the primary device so that onboard microphone of the secondary device can register the production of the audio sample from the speakers. If so, the microphone can share the audio data with the verification application, which will "hear" the unique audio signal and communicate this information to the secured resource service provider/website. Once the service provide receives this information and verifies the audio that was generated and the audio that was received are a match, the system can determine that the person who is sitting in front of the primary device that generated the unique audio signal has the identity of the person whose account access is requested. Based on this determination, the service provider system can automatically log the user into the website (or other secured resource) without any further authentication needed. It may be appreciated that such an approach can offer significant benefits particularly to those who have difficulty remembering passcodes and carrying physical security tokens, such as the elderly or persons with disabilities.

Furthermore, in different embodiments, the system may include a uniqueness requirement. If the user attempts to trigger this authentication method at a busy location (e.g., a public location such as an airport, restaurant, etc.) the service provider system may receive information from several mobile handsets that have the verification application installed and are also in close proximity to the primary device that is generating the unique audio signal. In this case, the system can inform the user that this form of authentication is not permitted and another form of authentication needs to be used that is appropriate for a more crowded location.

It can be appreciated that the proposed systems and methods can offer significant advantages in combating the growing threat of identity theft, security hacks, and video forgery. Deep fake algorithms in particular are becoming increasingly sophisticated. By generating a face through a deep learning neural network, such algorithms are able to replace a real face with an imposter fake face in real time. Such algorithms can be implemented using both Artificial Intelligence (AI) and Machine Learning (ML) to 'trick' a secured system into releasing confidential information. While existing technologies allow digital watermarks to be added to images, videos, and audio files or streams to ensure the authenticity of distributed media, the use of such technologies is typically controlled by producers of the media rather than by a speaker within a video. As will be discussed below, the proposed systems can further be configured to verify a user's identity with minimal user effort and offer a simplified, efficient, and ultimately highly convenient process by which to authorize and grant the user access to secured resources. Such systems can rely on device infrastructure that is already in place for sound production and detection, making it simple to deploy at a low cost.

References to various aspects of access management will be discussed throughout the following disclosure, including identification, authentication, and authorization. For purposes of this application, the term 'identification' refers to the process of associating a user with something that has occurred on a server, on a network, or with some other resource, and typically occurs when a user (or any subject) claims or professes an identity. Traditionally, the process of identification can be accomplished with a username, a process ID, a smart card, or anything else that can uniquely identify a subject. In addition, the term authentication refers to the process of proving (or verifying) an identity or source of identity, and typically occurs when subjects provide appropriate credentials to prove their identity. For example, when a user provides the correct password with a username, the password proves that the user is the owner of the username. Thus, the authentication provides proof of a claimed identity. In the embodiments described herein, authentication of an image based on the detection of a specific output in the image can be used to prove the user is the owner of the username. As a general matter, three main methods of authentication include (a) user knowledge, such as a password or PIN; (b) user possession, typically provided by the secured system, such as a key, smart card, CAC (Common Access Card), PIV card (Personal Identity Verification card), RSA, or other card or token, magnetic stripe cards, certificates with a digital signature, computing device that is configured to receive a control signal, etc.; and (c) biometric factors, such as voice recognition, facial recognition, retinal and fingerprint scans, etc. For purposes of this application, a "token" can represent any one of these knowledge factors, possessions, and biometric factors.

Authorization refers to the concept of allowing access to resources only to those permitted to use them. In other words, authorization is a process that protects resources by only allowing access by consumers that have been granted authority to use or receive them. Some examples of such resources include individual files' or items' data, computer programs, websites, online accounts, critical information, computer devices and functionality provided by computer applications, as well as more tangible resources such as ATMs, banks, vaults, offices, or other spaces with specific security requirements. In addition, the use of the term "secured resources" refers to services, features, or other resources (physical and digital or virtual) that are access-restricted and are designed to be made available only to users that have been authenticated and authorized for such access. The term "passive" refers to the concept of a system and method that is not dependent on any particular 'active' interaction of a person with a device resulting from a change in the person's normal activity or behavior and/or do not require the user to remember anything. In other words, walking and moving their body (e.g., adjusting the position of their arm) from one location to another are passive interactions, as the person would perform these activities regardless of the authentication system that is in place. However, other user actions, such as but not limited to providing a passcode, security question answers, etc. are active inputs and a system requiring any of these types of information would not be considered passive. In addition, this type of arrangement—relying on a secondary device that is already carried by the user—precludes the need to previously record and store any biometric data (e.g., retinal scan, fingerprint scan, voiceprint, etc.) for the user, which some users are uncomfortable doing.

Organizations and businesses often provide support to customers by making available to their customers one or more member service representatives (MSRs) or other customer representatives and service agents (referred to generally herein as "agents") who have access to networked computers, telephones, often networked to a larger corporate computer network, including mainframes, microcomputers and LANs. For example, voice and data pathways into the center can be linked through routing servers and computer telephony integration (CTI). In some cases, CTI also facilitates interfaces with customer support servers in addition to any e-mail system, databases and web-based services. A customer may seek access to an online resource, or contact or be contacted by an MSR, to learn more about a service or product, obtain guidance, or purchase various items, and/or manage their secured resources. Implementations of the proposed systems and methods may also include interactions with an agent, virtual or human, of a secured system. This service representative or agent is stationed at a location that is remote relative to the customer's location, such as a call center. As used herein, the term "customer", "member", or "user" should be understood to refer to any end-user or person requesting or receiving assistance or other communications from a secured system, including via a website or other online portal, or via a communication session with a remote agent, whether human or virtual/artificial. The customer can typically view at least one aspect of the interaction through a display of their computing device.

For purposes of introduction, an overview of one embodiment of the proposed systems and methods is illustrated with reference to FIG. 1. In FIG. 1, an example of an authentication process is shown in which a first user 102, in a first location 190, is seeking access to secured resources over network 106 via primary computing device ("primary device") 172 such as a desktop computer, tablet, smartphone, or laptop, etc. As noted above, in some embodiments, the access can be sought via a website 174 associated with the secured resource service provider whose systems are in a remote location ("remote server" 100). In an optional embodiment, the access can be sought via or facilitated by a representative 110 (e.g., at a call center). In FIG. 1, the first user 102 can be understood to be conversing with representative 110 in order to be authenticated and then obtain access to their account or other secured resource. In different embodiments, first user 102 can participate in the communication session or web-access session via the primary device 172 configured with a network connection and connected to an audio output device (e.g., speakers 180). For example, the first user 102 can be speaking and listening to the representative 110 via their desktop computer. In one case, the first user 102 may be speaking over network 106 to the representative 110 and has requested access to their secured account details. In other examples, the first user 102 may have accessed the website 174 and made their login request.

As shown in FIG. 1, in some embodiments, first user 102 may also have access to a secondary user computing device ("secondary device") 182. In one embodiment, secondary device 182 is a mobile device, for example, a smartphone, mobile phone, laptop, tablet, smartwatch, or other wearable or portable computing device that can receive signals over a network including but not limited to smart glasses, smart jewelry, smart medical devices, smart apparel, and other smart wearable accessories.

As a general matter, in different embodiments, computing devices such as the secondary device 182 and/or the primary device 172 can include an electronics unit comprising a plurality of different components, such as one or more of various user interface components (e.g., a touchscreen display, keyboard, mouse, microphone, camera, speaker, etc.), a user interface module, a processor, and/or a communication module. These devices may include a system including one or more processors and memory. Memory may comprise a non-transitory computer readable medium. Instructions stored within memory may be executed by the one or more processors. The secondary device 182 and/or primary device 172 may be configured to receive and analyze data from various input sensors associated the device or data that is communicated from external components or devices to the device. In some cases, the secondary device 182 and/or primary device 172 may also include a navigation system equipped with a GPS receiver that can receive GPS information or other receivers capable of receiving global or local positioning information.

A communication module may allow the secondary device 182 and/or primary device 172 to communicate wirelessly. In this case, the communication module is illustrated as a wireless connection; however, wired connections may also be used. For example, the communication module may include a wired serial bus such as a universal serial bus or a parallel bus, among other connections. The communication module may also include a wireless connection using Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities.

In different embodiments, the secondary device 182 and/or primary device 172 may include a device display ("display") that can, for example, present information and various media for a product/service support software application offered by the service provider ("app", or "verification app"). In some embodiments, the app is associated with the provider of the secured resources for which the service representative is offering support. In some embodiments, the first user 102 can receive and send information through a user interface that may be presented on a display for the primary device 172. In some embodiments, the display may be a touchscreen, allowing the customer to interact with the user interface directly by touch. The user interface may refer to an operating system user interface or the interface of one or more software applications that may run on the either or both of the primary device 172 and secondary device 182. In some embodiments, the user interface can include a messaging window or other chat-space by which the service representative may send messages or other digital content. Alternatively, in some embodiments, the first user 102 can also speak with the service representative via a voice calling application on primary device 172.

Furthermore, in different embodiments, remote server 100 includes at least one computer system 112. The term "computer system" refers to the computing resources of a single computer, the partial computing resources of a single computer, a plurality of computers communicating with one another, or a network of remote servers. In one embodiment, computer system 112 includes at least one server having at least one processor.

In the embodiment of FIG. 1, computer system 112 includes one or more computing devices 114 (for example, a server) that may be in communication with one or more databases 116. Databases 116 could be co-located with computing devices 114 or could be remote databases that are accessible by computing devices 114 over a network. Databases 116 can include any kind of storage devices, including but not limited magnetic, optical, magneto-optical, and/or memory, including volatile memory and non-volatile memory. In an example embodiment, computer system 112 may also include or be configured with access to an access management system (see FIG. 2) that employes an audio event authentication module 113. Throughout this application, the phrase "authentication system" may be used interchangeably with "access management system". In some embodiments, audio event authentication module 113 may be implemented in software, hardware, or a combination thereof.

In different embodiments, while the first user 102 is requesting access to the secured resource, the access management system can be configured to verify an identify of a person so as to either permit or deny access to the user-identity dependent services. As used herein, the term "user" or "member" or "account holder" should be understood to refer to any end-user or person requesting or receiving assistance or other secured/confidential/private communications from the remote server 100 and/or the support agent or service representative. It should be understood that while the following description presents a possible sequence illustrating the use of the proposed systems and methods in a customer-agent dynamic or a customer-website dynamic, in other embodiments, the proposed systems may be utilized by a broad range of end-users, including other types of work calls and corporate calls, or other instances in which access is restricted.

In embodiments in which the representative 110 is involved, the representative 110 may have access to a device of computer system 112. In one embodiment, representative 110 may have access to a representative device 117. In FIG. 1, representative device 117 is depicted as a mobile computing device, such as a smartphone or tablet computer. In other embodiments, representative device 117 could be a desktop computer, a laptop computer or any other kind of computing device. Using representative device 117, representative 110 may be able to review secure customer records, send documents and forms to a customer, provide access to a secured resource, and/or perform/facilitate other tasks required to help a customer requesting access to the system.

In one embodiment, computer system 112 may include a server that communicates with secondary device 182, primary device 172, as well as other remote devices (e.g., user devices of other users/customers) over the network 106. The primary device 172 and/or secondary device 182 may provide the front-end of a system that provides users with options for performing various kinds of tasks (for example, making fund transfers when the company is a bank, viewing their coursework and grades when the provider is a school, making changes to their medical records or information when the provider is a healthcare manager, etc.). In some cases, primary device 172 and/or secondary device 182 may run client software through a web browser, in which case the client software may be hosted on a server associated with computer system 112. In other cases, secondary device 182 and/or primary device 172 may run client software in the form of a native software application that has been downloaded through a centralized marketplace (i.e., an "app store"). In some cases, while the client software that allows users to perform various tasks may be run on primary device 172 or secondary device 182, the data may be retrieved from and stored on databases associated with computer system 112 (e.g., databases 116).

Following the first user's request for access, in different embodiments, the remote access management system can in response automatically, or at the manual request of the service representative, initiate an authentication procedure, action, or task that includes a remote signal generation event. As a general matter, a remote signal generation event refers to the process and period during which the authentication system issues an audio control signal 170 to a remote user device (e.g., the primary device 172) over a network, and the audio control signal 170 causes the primary device 172 to produce an audio sample 184 via its connected speakers 180.

Thus, in different embodiments, the access management system, through audio event authentication module 113, can generate one or more signals in response to the access request by the user. In this case, the audio control signal 170 can be transmitted over network 106. The audio control signal 170 can, for example, include a unique ultrasonic audio signal that has been randomly generated by the audio event authentication module 113, as well as a request to the primary device 172 that causes the primary device speakers to emit the audio signal. The audio control signal 170 is received by the primary device 172 that the first user 102 is using to log into the website 174. As shown in FIG. 1, in response to the audio control signal 170, the primary device 172 produces the unique audio sample 184 via speakers 180.

At or around the same time, in a different but synchronized or linked event, secondary device 182, which is within audio range of the primary device 172, picks up or otherwise detects the playback of the audio sample 184 via its audio sensor/microphone. A verification app 104 installed on the secondary device 182 can register this incoming sound and responsively generate and transmit a confirmation signal 140 over network 106 to the audio event authentication module 113 for the access management system.

Based on the received confirmation signal 140, the access management system will determine whether to authenticate the user for access to the secured resource. For example, in some embodiments, the confirmation signal 140 can simply indicate that an ultrasonic audio sample was detected with the timestamp matching the time at which playback at the primary device 172 was to have occurred. However, in other embodiments, the confirmation signal 140 can include a copy of the incoming audio sample 184. This copy can then be compared to the record of the audio sample that was originally sent as part of the audio control signal 170. If the expected audio pattern is detected in the confirmation signal 140, the user can be authenticated, providing an additional layer of veracity to the user's identity. In this example, confirmation signal 140 does include a copy of the audio that matches the original audio, and the system automatically causes access to be granted. In those cases where a service representative is involved, the system can also or alternatively communicate this information to the service representative so that they can proceed with discussing confidential matters or permitting access to other secured resources. Thus, in FIG. 1, without further action or presentation of credentials by first user 102, access to the account linked to the authenticated identity of the first user 102 is granted. The first user 102 is then able to make account requests and/or receive sensitive account information.

While in some embodiments the system may incorporate additional layers of authentication that may supplement the authentication process, such as facial recognition, voice recognition, fingerprint recognition, password or pin-code verification, or other such factors, it may be appreciated that the system can be readily implemented without such additional steps. In other words, the first user 102 is able to obtain access to the desired secured resources without an identification card, debit card, or other system-provided token typically presented for such occasions. The system thereby allows the user to be passively (i.e., 'touchlessly') authenticated. In some embodiments, the system is further configured to automatically provide the user with access to the secured service linked to the user's unique account, in response to the authentication that is performed based only or primarily on the sound data capture of the audio signal that is played back at the primary device 172.

Figure 2:
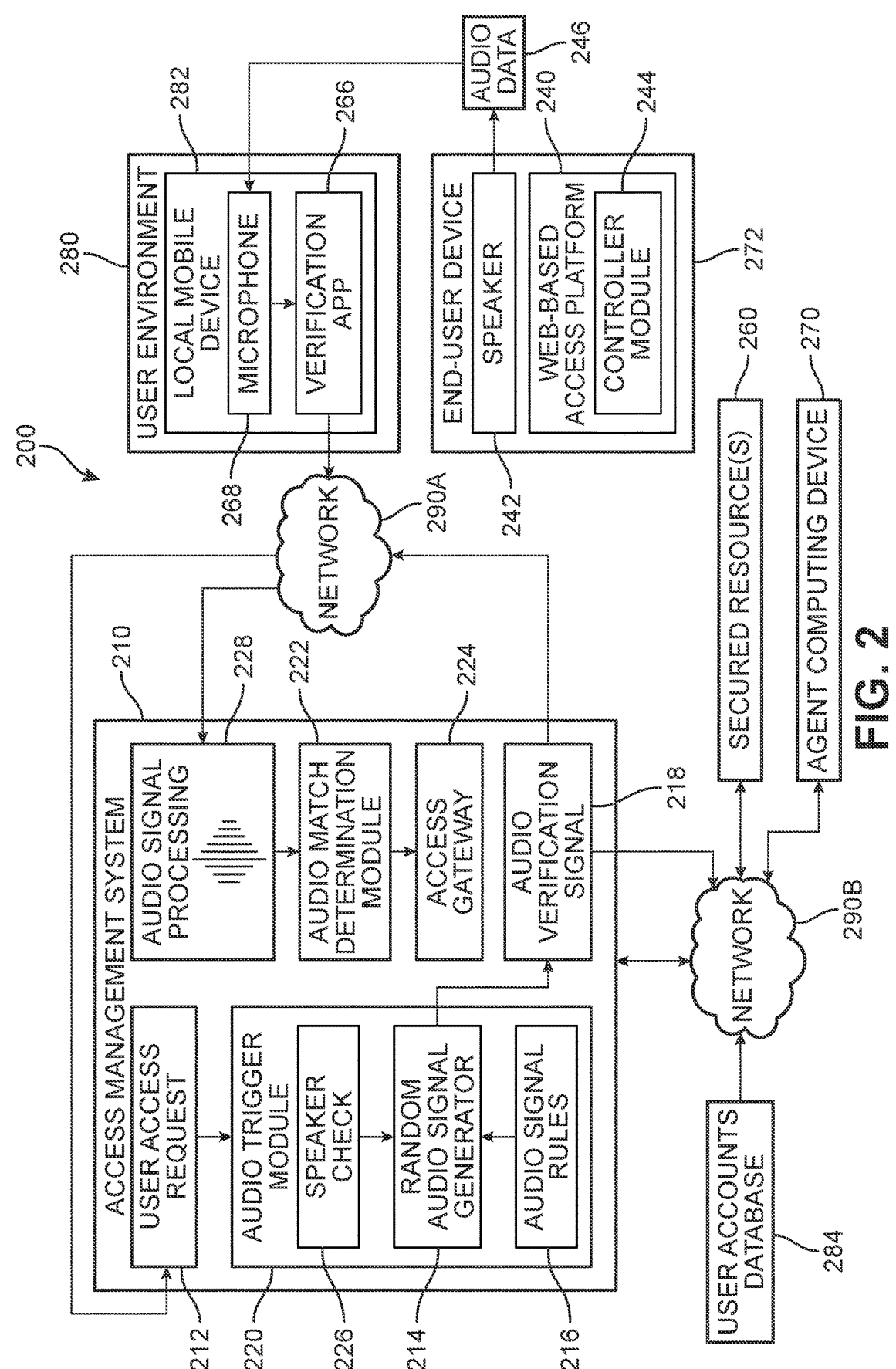
FIG. 2 is an overview of an environment of an audio signal-based authentication and access management system, according to an embodiment.

For purposes of clarity, an overview of an environment 200 for an implementation of an embodiment of an access management system is depicted in FIG. 2. It should be understood that the environment 200 as presented is for purposes of illustration only, and other embodiments may utilize different or additional components or processes. The environment 200 may alternatively include additional, fewer, or different components. For example, the environment 200 may include additional storage devices, additional servers, additional computing devices, and other features not shown in FIG. 2.

In FIG. 2, the architecture 200 can be seen to include an access management system ("system") 210, a primary computing device ("primary device") 272, a secondary computing device ("secondary device") 282 that is to be located in an environment 280 around the user and their primary device 272, and an optional agent computing device ("agent device") 270. Devices and components of architecture 200 can communicate with each other and with other components of architecture 200 over one or more networks (shown here as 290A and 290B, and referred to collectively as 290). The networks 290 may comprise any number of electronic devices and use any number of communication protocols to facilitate data communications within the network 290. One having skill in the art would appreciate that the network 290 may include a variety of internal and/or external networks 290 of various types implementing various data communications technologies. The communication over the network may be performed in accordance with various communication protocols such as Transmission Control Protocol and Internet Protocol (TCP/IP), User Datagram Protocol (UDP), and IEEE communication protocols. The networks 290 can include a wireless (e.g., Wi-Fi, Bluetooth®) or wired data network, a cellular network, a telecommunications network, an enterprise network, an application-specific public network, a Local Area Network (LAN), a Wide Area Network (WAN), WLAN, MAN, a private network, a public network such as the Internet, an ad-hoc network, a network that includes a satellite link, or another type of data communication network. The network 290 may include a physical and/or logical architecture defined by firewalls, proxy servers, routers, switches, or similar features that implement various levels of security and my function as logical gateways or boundaries.

Furthermore, while some of the various components of environment 200 are shown as residing in primary device 272 and secondary device 282 in FIG. 2, in other embodiments some or all components or modules described herein are accessed through a cloud network and/or stored on a cloud-based server, or components are assigned to different modules. Thus, in different embodiments, platform 240 and verification app 266 or components thereof can be hosted on a server and accessed remotely by the primary device 272 and/or secondary device 282, rather than being locally stored on those devices. Conversely, one or more modules or components of the system 210 shown in FIG. 2 can alternatively locally reside in one or both of primary device 272 and secondary device 282. In different embodiments, the various modules of the environment 200 can be understood to comprise a cloud-based server and may include computing devices comprising any number of components, such as a Network Interface Card (NIC), allowing the respective devices to receive, transmit, process, and store information from external computing systems. In other words, the environment 200 may include groups or subgroups of computing devices that can communicate with each other, but not necessarily with the computing devices in other groups or subgroups. The environment 200 may include computing devices of disparate types, having different types of hardware and software configurations and in a variety of different locations. In some cases, multiple devices or subsystems can be identified together as a single computing device It can be seen in FIG. 2 that primary device 272, secondary device 282, system 210, and agent device 270 can be configured to work and communicate with one another, as well as access secured resources 260 and other regulated data such as that stored in a user accounts database 284. The system 210 can be understood to comprise a cloud-based server and may include computing devices comprising any number of components, such as a Network Interface Card (NIC), allowing the respective devices to receive, transmit, process, and store information obtained from the image capture devices. In other words, the system 210 may include groups or subgroups of computing devices that can communicate with each other, but not necessarily with the computing devices in other groups or subgroups. The system 210 may include computing devices of disparate types, having different types of hardware and software configurations and in a variety of different locations. In some cases, multiple devices or subsystems can be identified together as a single computing device.

In different embodiments, the system 210 includes or is configured to access one or more databases, such as user accounts database 284. The user accounts database 284 can refer to a content library that stores account data related to one or more users. The data may include, for a plurality of users, name, personal and professional details, user facial recognition data, biometric data, login data, current and past policy for the user, credit limit of users, among other details.

In addition, in some embodiments, the primary device 272 includes a local app or internet access portal for connecting with a web-based access software platform ("platform") 240. In some embodiments, the platform 240 can also operate in conjunction with a telephony/videoconferencing application ("application" or "app") such as a teleconferencing software application. For example, implementations described herein may be performed via any electronic communications between an agent and a customer including, but not limited to, telephone, video telephone, chat (e.g., IM, Slack™, Jabber™), video chat (e.g., Skype™, MS Teams™, Zoom™, Facetime™), internet based meetings (e.g., WebEx™), custom call-center systems, and other conference call systems. In addition, the platform 240 can be configured to present various interfaces by which administrator or other users can interact with features of platform 250. In different embodiments, primary device 272 and/or platform 240 can include a software application, widget, or other feature by which control signals received from the system 210 may be executed, represented here as a controller module 244. In other embodiments, controller module 244 can be configured as a simple software execution mechanism which receives, translates, and presents output in response to signals received by the platform 240.

As described herein, in different embodiments, an alleged (i.e., purported, unverified) user can initiate/request access to a secured resource. This user access request 212 can be created at platform 240, which then transmits the request over network 290 to the system 210. In some embodiments, the user access request 212 is shared with and received by an audio trigger module 220. The audio trigger module 220, in response to the user access request 212, can cause the platform 240 to initiate a speaker check 226 via controller module 244. The system 210 can thereby confirm the primary device 272 has speakers/audio output device that is operational, and in some cases with audio settings set to a speaker volume above a predesignated threshold (e.g., 50%, 75%, 100%, etc.) to ensure the audio that will be emitted is played at a sufficient strength so as to be detected by another device. If the platform 240 transmits an enable/greenlight speaker status message (e.g., "permission to proceed") to system 210 indicating that the speaker check was successful, the audio trigger module 220 can initiate the creation of an audio verification signal 218 via a random audio signal generation module ("random audio signal generator") 214. In different embodiments, the random audio signal generator 214 includes provisions for creating a random electrical signal (hereinafter referred to as an "audio verification signal") that can be provided to a speaker array for transformation into sound.

In some embodiments, the random audio signal generator 214 can receive instructions for the characteristics of audio required (e.g., sound should be outside human hearing frequency range, or within some other window of frequency, the sound should include a particular pattern, its level of complexity, or have a specific duration, etc.) which can be specified by the service provider as stored in an audio signal rules module 216.

For example, the audio signal created for playback by the primary device can be randomly generated or in accordance with system settings by reference to audio signal rules module 216. The audio signal rules module 216 includes one or more audio signal parameters that may be used for designing the audio sample. These signals may be required to be a few seconds in duration, or a few minutes in duration.

In some embodiments, the signals are configured to be audible, and playback will be heard by the user. In some other embodiments, the signals can be inaudible to the human ear, but will be picked up by the microphone 268. For example, there are sounds that have been designed to be completely inaudible to humans (40 kHz or above), yet are audible to any microphone. Such sounds combine multiple tones that, when interacting with the microphone's mechanics, create a "shadow", which is a sound that the microphones can detect. When the primary device emits the sound, it will be played as an inaudible signal that is received at the microphone 268. In other embodiments, ultrasonic frequencies may be transmitted to the secondary device that will be picked up by the microphone 268.

In some embodiments, once created according to the requisite audio sample standards, the audio verification signal 218 can be shared with the platform 240 over network 290. In response, controller module 244 can trigger playback at a speaker 242 of the primary device 272 of audio data 246 that was carried by the audio verification signal 218. In different embodiments, once the audio data 246 is emitted by speaker 242, if there is a nearby mobile device in the user environment (e.g., within a vicinity of the primary device that permits the audio to reach the secondary device) that has the authentication app installed, a detection process can be triggered. For example, in different embodiments, secondary device 282 includes a local instance of a verification app 266 associated with the access management system 210. The verification app 266 can have been previously installed on the device by the owner of the secondary device 282.

In different embodiments, the secondary device 282 in user environment 280 can be within sensor range of a microphone 268 connected to the secondary device 282. The microphone 268 then picks up or collects audio data 246. In some embodiments, the audio data 246 can be converted into a digital signal by an analog-to-digital converter (ADC) for verification app 266. The verification app 266 can, in response to detection of this audio, automatically generate a confirmation message via network to the system 210. In one embodiment, the confirmation message can include a copy of the digital audio signal that was received/recorded by the microphone 268.

In different embodiments, the system 210 can then process the audio signal at an audio signal processing module ("signal processor") 228 using audio signal processing algorithms and/or software. In other examples, this processing may first occur by signal processing algorithms at the secondary device 282 and the output shared with system 210. In different embodiments, the processed audio data can be received by an audio match determination module 222 that can use some combination of time and frequency to determine whether the received/recorded audio data matches the original audio generated. In one embodiment, the system 210 is configured to compare the recorded audio of audio data 246 against the reference audio sample (i.e., the audio signal that was created by random audio signal generator 214 and delivered to the secondary device 282). If the samples match within certain parameters, the user is deemed to pass the authentication or verification test, indicating that the user is in possession of a device running the verification app.

In some embodiments, the recorded audio data is processed and models or representations of the sample of audio are built. These models are compared against one another. In different embodiments, one or both samples may be deemed unacceptable or unusable if the sample is too loud or too soft (amplitude), or if there is too much noise (poor signal to noise ratio). If a sample is not acceptable the system may trigger another playback of the audio from the primary device (either the same audio signal or a different/newly outputted audio signal by random audio signal generator 214).

In different embodiments, if the samples are acceptable or sufficient, a scoring can occur via audio match determination module 222. The scoring process is analogous to "what is the probability that the sounds captured by the secondary device are the same as the verification audio sample that was provided to the primary device by the system?" Thus, in some embodiments, the determination of a "match" is not necessarily based on the verification/reference sample directly or exactly matching the content of the user audio sample, but rather on the two samples being substantially similar or sharing particular features. The returned score is evaluated against a threshold value to determine if it meets or exceeds the minimum acceptable score by an access gateway 224. If the score is determined to be high enough (successful match), the service 210 may allow a user to proceed with their access via platform 240 to the requested secured resource(s) 260 being safeguarded/managed by the service provider systems. In other embodiments, audio match determination module 222 can be configured such that the captured audio must directly correspond to the audio signal in order for a match identification to occur.

Thus, the two audio data samples are compared by the audio match determination module 222, and if a match is found or is in an acceptable range, the access to secured resource(s) 260 by the user will be allowed and/or enabled by access gateway 224. Otherwise, access is denied, pending further verification. Thus, authentication based on verification of the user's proximity to a secondary device running the requisite verification app strongly implies that the user's identity is true and correspondingly is in fact entitled to whatever access is being requested. It should be understood that while the system 210 bases access decisions at least in part on the detection of the audio played back by the primary device, the system is further configured to first confirm that the user ID and optional password match based on information available in the user accounts database 250.

Although not detailed in FIG. 2, it should be understood that a support agent (human or virtual) can be connected to and interact with customers via a call management or customer support server that can manage the distribution, transfer, and handling of various calls that come into the support center. For example, a customer may be routed via the customer support server to an appropriate agent computing device associated with a particular member service representative (MSR) better suited to respond to the particular caller. In different embodiments, the agent device 270 can be connected to or include an internet customer interface for providing support specifically to customers or members who contact them via the Internet. As a general matter, support agents or service representatives can refer to any person or personnel who offers the caller (or person who was called) assistance, and has access to the platform 210 during the communication session with the customer.

Figure 3:
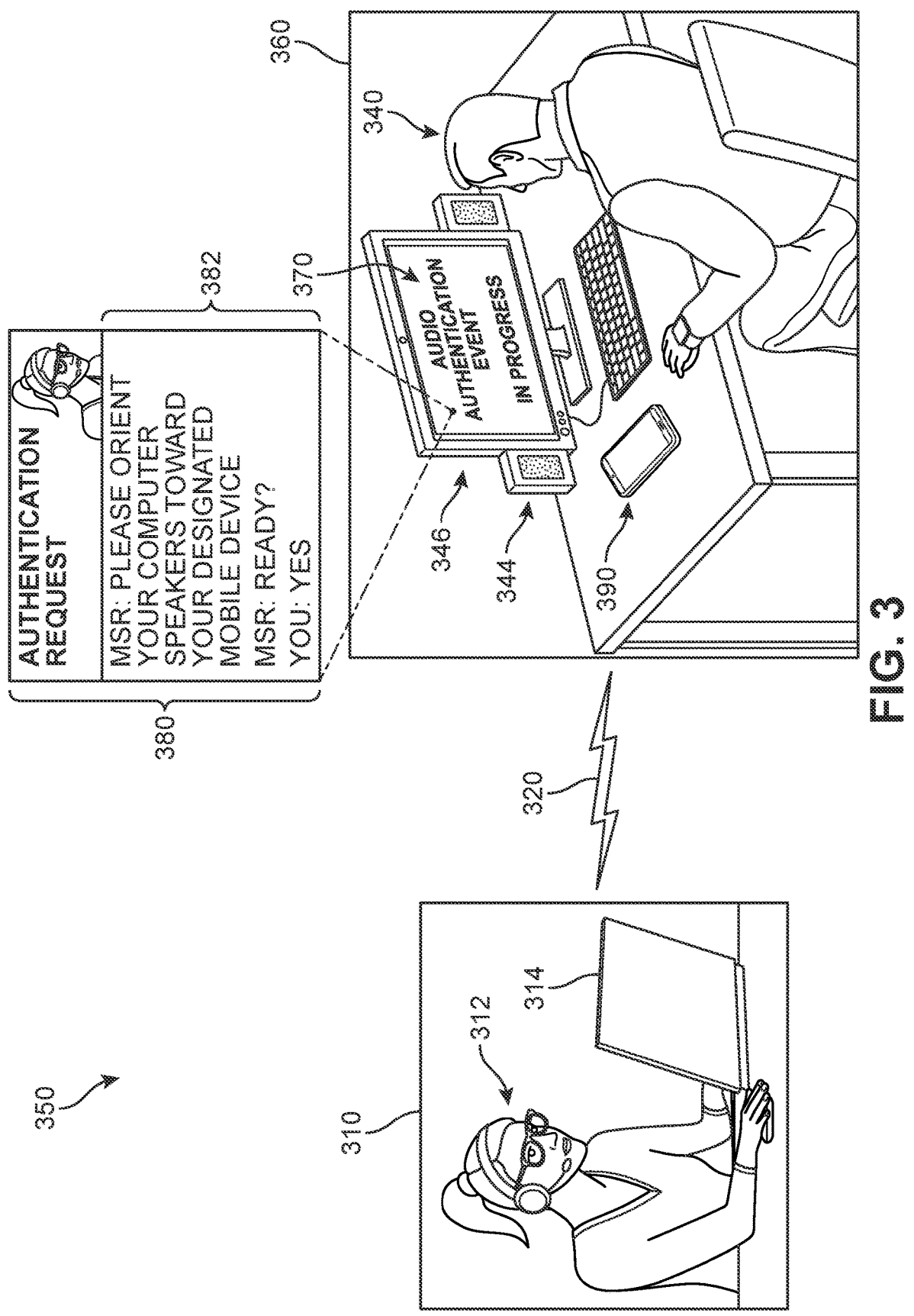
FIGS. 3 and 4 depict an example of a user requesting access to a secured resource and the authentication system initiating a remote audio signaling event, according to an embodiment.

Referring now to FIGS. 3-6, an example of an authentication scenario occurring during a communication session 350 between a second user 340 and an agent 312 representing a service provider is depicted. In FIG. 3, the second user 340 is, via a first computing device ("primary device") 346 at a remote location 360, requesting access to secured resources via a web-based access management platform 370 as they are communicating with an agent 312 over network 320. Primary device 346 includes speakers 344. The second user 340 also has a smartphone near the first device 344 which serves as their secondary device 390. The agent 312 is communicating with second user 340 via a third computing device ("third device") 314 located at a remote site 310 such as a call center or other business. In other examples, the agent 312 need not be human, but instead can be supplied by an automated response messaging system or an artificial intelligence (AI) chatbot.

For purposes of this example, the second user 340 has requested access to secured resources associated with a user account managed by the entity which agent 312 is representing. In this case, an optional first user interface ("first interface") 380 provides a first chat window 382 to allow the second user 340 to partake in an instant messaging session with the second agent 312 ("Authentication Request-MSR: Please orient your computer speakers toward your designated mobile device/MSR: Ready?/YOU: Yes").

Thus, in different embodiments, it can be understood that a user can communicate via an interface generated by an application provided by access management system. The application can offer a user interface that may be accessed via any user computing device configured for connection to a network. In different embodiments, the application can be configured to offer content via native controls presented via an interface. Throughout this application, an "interface" may be understood to refer to a mechanism for communicating content through a client application to an application user. In some examples, interfaces may include pop-up windows that may be presented to a user via native application user interfaces (UIs), controls, actuatable interfaces, interactive buttons or other objects that may be shown to a user through native application UIs, as well as mechanisms that are native to a particular application for presenting associated content with those native controls. In addition, the terms "actuation" or "actuation event" refers to an event (or specific sequence of events) associated with a particular input or use of an application via an interface, which can trigger a change in the display of the application. This can include selections or other user interactions with the application, such as a selection of an option offered via a native control, or a 'click', toggle, voice command, or other input actions (such as a mouse left-button or right-button click, a touchscreen tap, a selection of data, or other input types). Furthermore, a "native control" refers to a mechanism for communicating content through a client application to an application user. For example, native controls may include actuatable or selectable options or "buttons" that may be presented to a user via native application UIs, touch-screen access points, menus items, or other objects that may be shown to a user through native application UIs, segments of a larger interface, as well as mechanisms that are native to a particular application for presenting associated content with those native controls. The term "asset" refers to content that may be presented in association with a native control in a native application. As some non-limiting examples, an asset may include text in an actuatable pop-up window, audio associated with the interactive click of a button or other native application object, video or other media associated with a user interface, or other such information presentation.

In other embodiments, the communication can occur in part or fully via a video conferencing interface whereby the agent 312 and second user 340 speak in real-time over a video screen. Once the second user 340 submits his request for access, an audio signaling event is automatically triggered by the access management system or initiated by the agent 312, as depicted below in FIG. 4. In some embodiments, the system and/or platform can first determine whether the speakers 344 are powered on and set at least at the minimum detectable volume, and send a greenlight message to the system that speakers are ready. If the operational status of the speakers 344 cannot be verified as active/operational, the platform can send a "redlight" or block/disable message to the access management system, which can in response prevent the use of the audio signaling process. In some embodiments, the system can instead require that the user employ an alternate (non-audio-based) method of authentication and/or cause the primary device to automatically shift to a different authentication process (e.g., biometric, passcode, tokens, etc.). In some embodiments, the system can request that the user move to a more private space/location where the user's secondary device will be the only computing device in audio sensor range of the primary device before permitting the audio signal-based authentication process to proceed.

Figure 4:
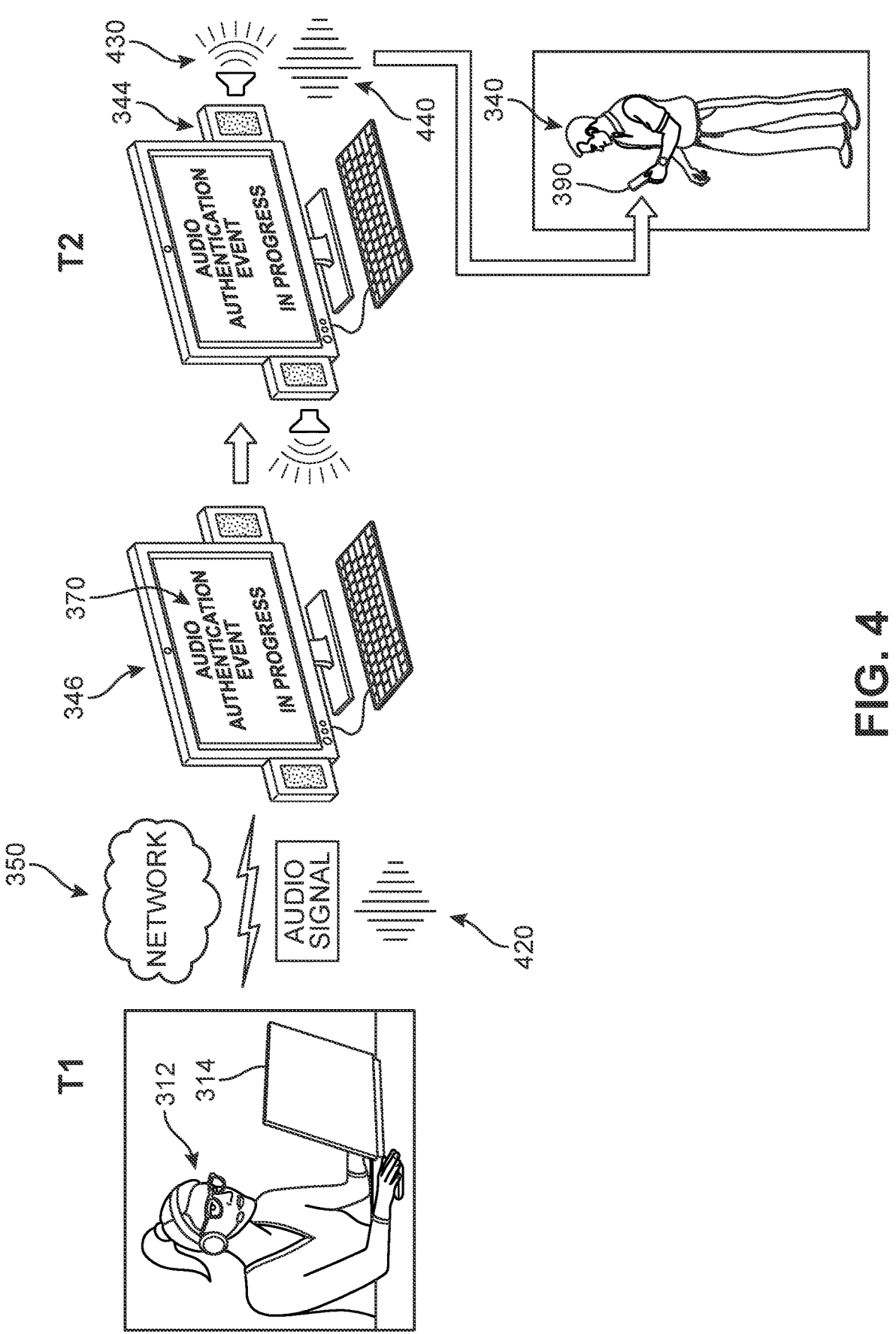

Moving to FIG. 4, in different embodiments, the audio signaling event can occur at a first time T1 shortly after and in response to the request for access from the user is received by the system. An audio signal 410 which includes a first audio pattern 420 is transmitted from the remote system over network 350 to the authentication website/portal or other access management platform 370 at primary device 346. In response to the receipt of the audio signal 410, at a second time T2, the platform 370 causes the speakers 344 of the primary device 346 to emit an audio output 430 that corresponds to a second audio pattern 440. The secondary device 390, which includes a microphone, is now within audio capture range of the audio output 430, and registers and records the second audio pattern 440.

Figure 5A:
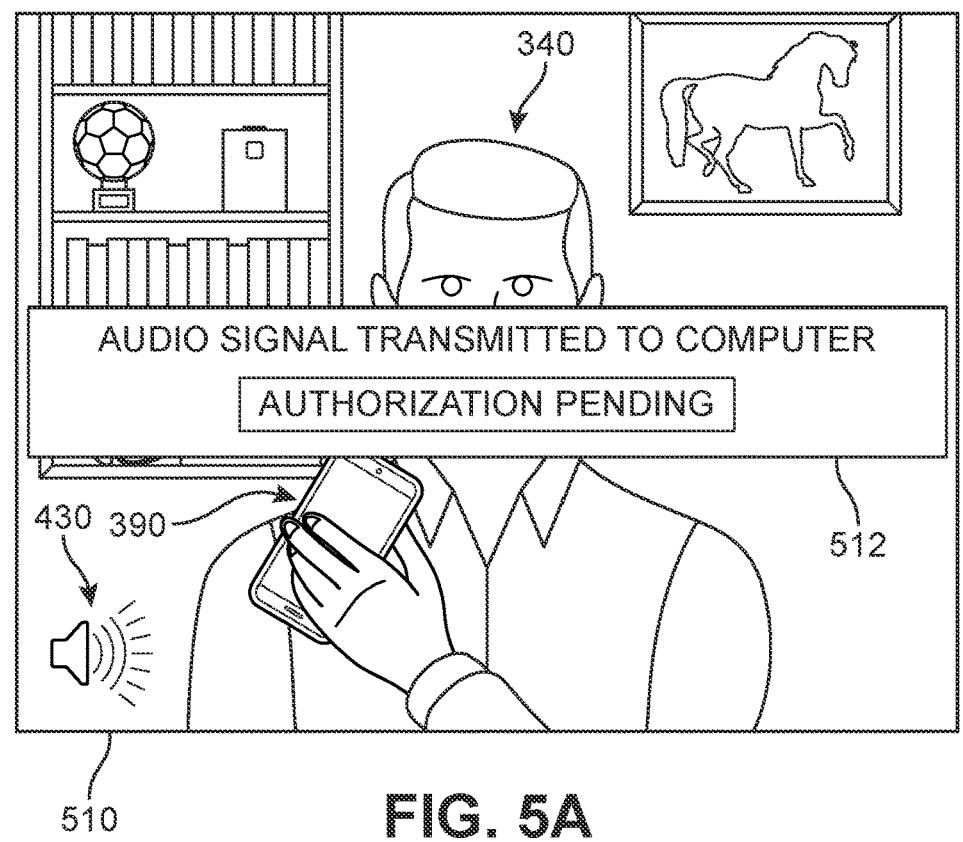
FIGS. 5A, 5B, and 6 depict an example scenario in which the audio signal is detected and used to authenticate the user and enable access to the secured resource, according to an embodiment.
Figure 5B:
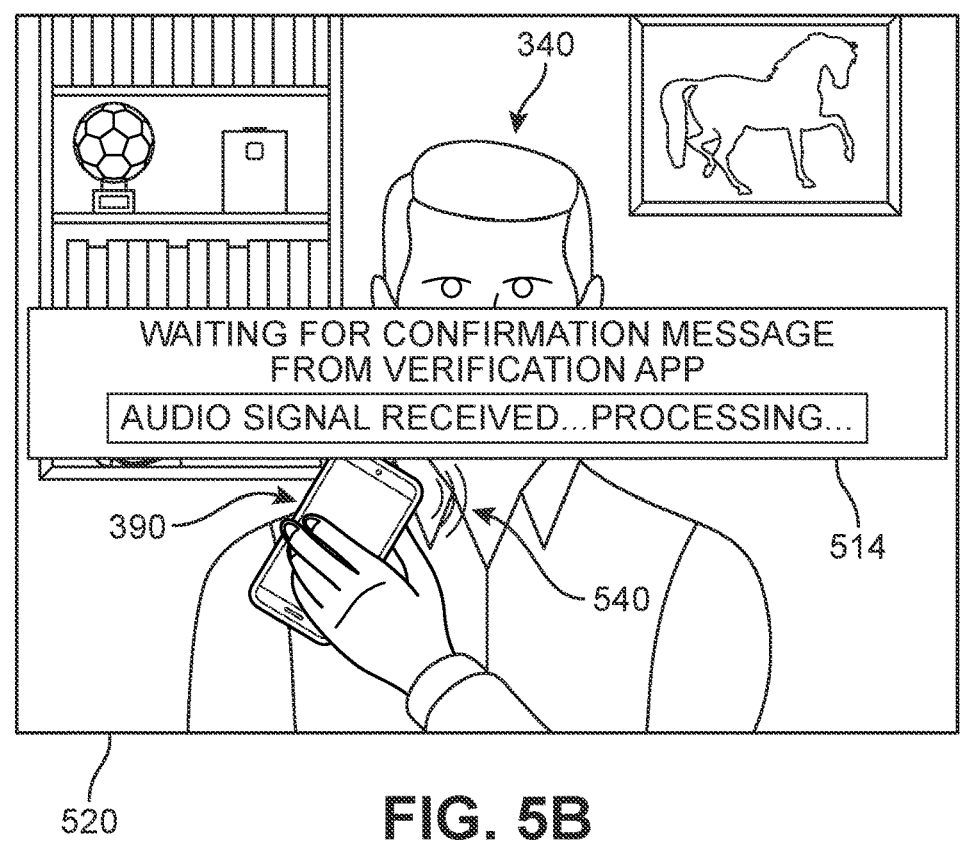

FIGS. 5A and 5B show a depiction of the second user 340 as they await authentication seated before their primary device. In FIG. 5A, the audio signal from the access management system has been successfully transmitted to the primary device, as indicated by a first status message 512 ("Audio signal transmitted to computer . . . Authorization pending"). In response to the audio signal, audio output 430 is presented by the primary device. In FIG. 5B, the audio output 430 of FIG. 5A has been successfully captured by the secondary device 390. In response, the secondary device 390 generates a confirmation message 540 that is transmitted over a network back to the remote system. The system initiates processing of the confirmation message and the recorded sound data, as indicated by a second status message 514 ("Waiting for confirmation message from verification app . . . Audio signal received . . . Processing . . . ").

Figure 6:
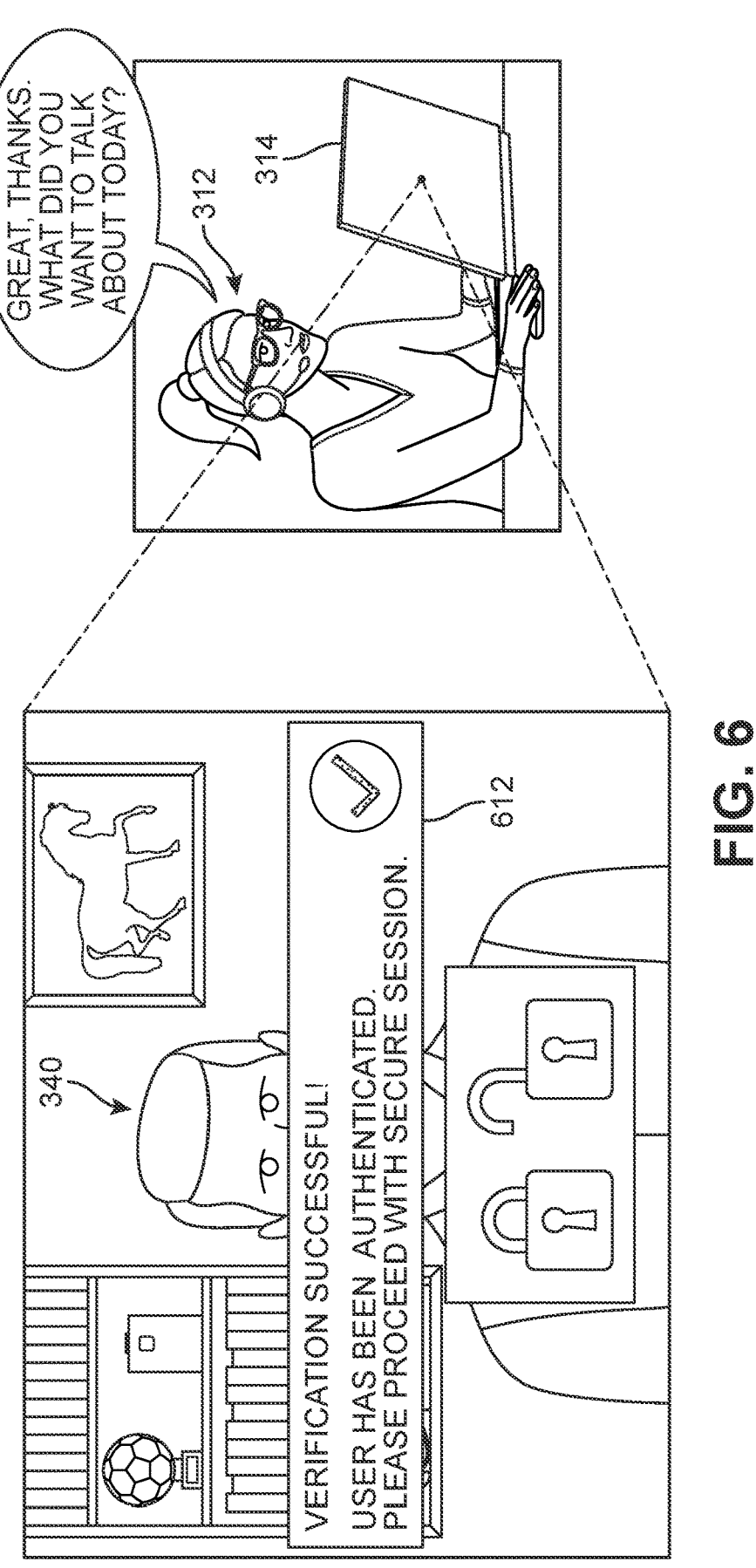

In different embodiments, the system can compare the audio pattern captured by the secondary device with the audio pattern that had been sent to the primary device. In FIG. 6, the patterns have been determined to be similar enough so as to be classified as a match, as indicated by a third status message 612 ("Verification successful! User has been authenticated. Please proceed with secure session"). The system can then automatically enable or grant the second user 340 access the secured resource, or the agent can respond to the verification by manually enabling access.

It should be understood that in other embodiments, the proposed systems can be configured to serve not only as an authentication of the member who is seeking access to some secured resource, but as an anti-phishing tool that protects the members themselves. For example, if an individual receives a call from a purported representative of an organization of which the person is a member (e.g., the caller alleges to be an agent of their credit card company, bank, insurance company, other secured resource service provider, etc.) the member may respond by explicitly requesting that the supposed agent initiate or cause a performance of the audio authentication event process as described herein (e.g., see FIGS. 4-6) during the call. The member who has been called can then monitor their device app as the app "listens" for an agent-triggered audio event. If an audio event is detected by the member's app that corresponds to an authentication signal, the app can present a message or other alert/indication that authentication of the caller-agent has been successful. The user can then be assured that the call is legitimate and that they are speaking with a verified agent. However, if no such audio event is detected by the user's device, or the caller states they cannot perform this action, the user can decline further conversation and disconnect the call. With this anti-fraud tool, the otherwise vulnerable user who might receive a call from a scammer is able to readily avoid the potential phishing attempt. Because the caller who had identified themselves as an agent of the service provider was unable to cause the generation of the requested audio signal for the member using the service provider's authentication systems (i.e., they could not show they had access to the service provider's systems), the member can deem the call fraudulent and withdraw from the communication. In other words, in different embodiments, the audio authentication event can be used to authenticate not only the member/user (as described earlier), but the person with whom they are speaking on a call, serving as real-time (in-the-moment) proof that the person who has called them is actually a legitimate representative of the service provider.

Figure 7:
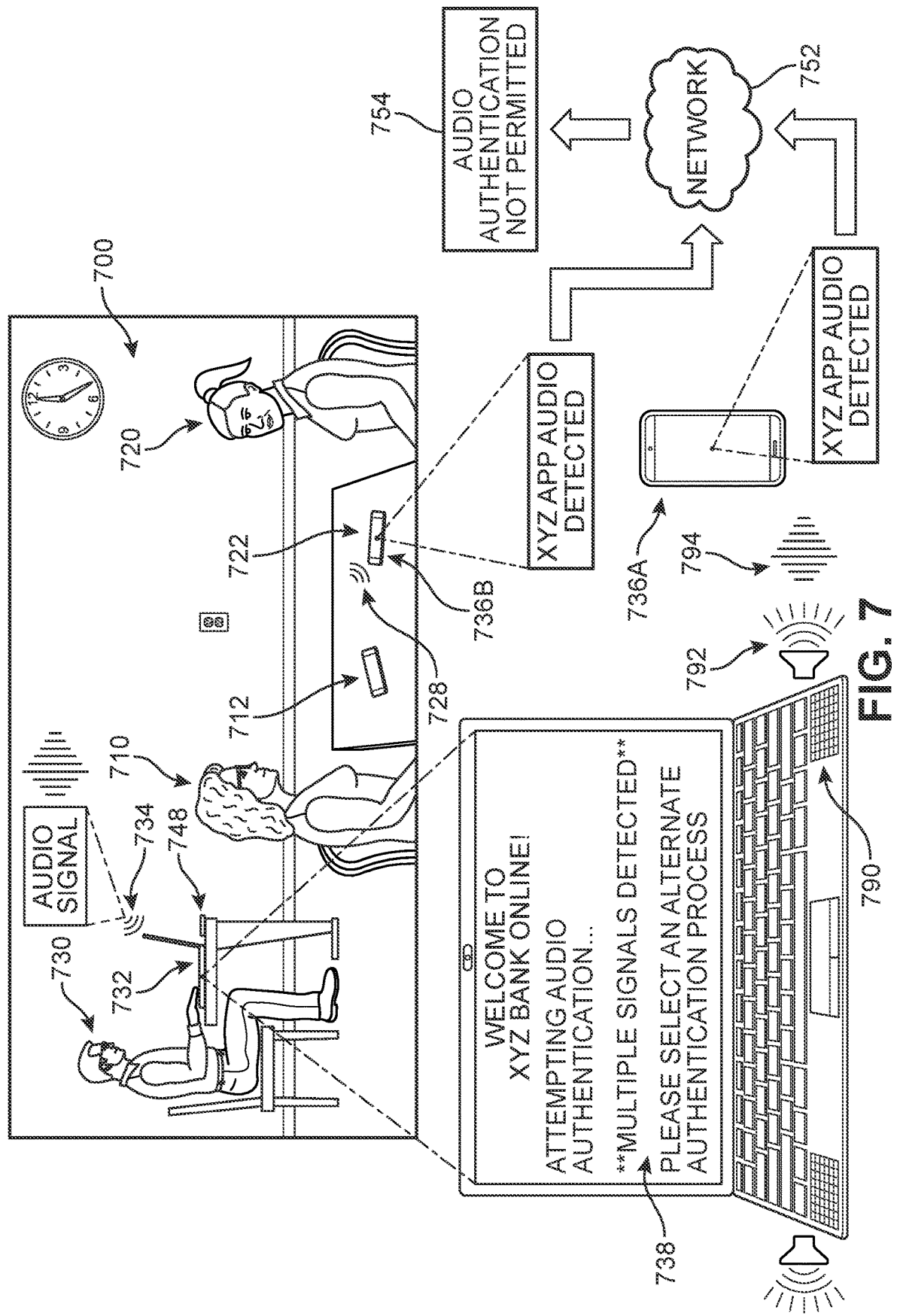
FIG. 7 shows a scenario in which the uniqueness requirement is triggered and precludes use of the audio signal-based authentication system, according to an embodiment.

For purposes of clarity, an overview of one embodiment of the proposed systems in which the audio-based authentication approach described above is disabled due to the uniqueness requirement is illustrated with reference to FIG. 7. In FIG. 7, an example of an authentication process is shown in which a third user 130 is logging into a secured website 738 (e.g., provided by their banking institution) via a client device 732 (i.e., the "primary device") with the goal of being authenticated and obtaining access to their account. A secondary device is also available nearby (i.e., third user's mobile device 748). In different embodiments, the client device 732 and/or the mobile device 748 includes a device display ("display") that can, for example, present information and media. For example, in FIG. 7, the user interface for the website 738 is depicted. In addition, a first instance of a verification app 736A is installed on mobile device 748, in the form of a native software application that has been downloaded through a centralized marketplace (i.e., an "app store").

In some embodiments, the default authentication method could include the audio signal detection by a secondary device (e.g., third user's mobile device 748 placed nearby on the same table as the client device 732), as described herein. However, in this case, the third user 730 is seated in a coffee shop 700 as they initiate their request for access to the website.

As shown in FIG. 7, at another table near third user 730, a first customer 710 and a second customer 720 are enjoying a conversation together in the coffee shop 700. As is typical in today's society, each customer is accompanied by their own personal mobile devices, where first customer 710 has a first mobile phone ("first phone") 712 and second customer 720 has a second mobile phone ("second phone") 722. Furthermore, for purposes of this example, second customer 720 can be understood to have another instance of a verification app 736B running on second phone 722, where the reference letter "A" indicates a first instance of the app 736 (running on the mobile device 748), and the reference letter "B" indicates the second instance of the app 736 (running on the second customer's device).

It can be appreciated that in these types of scenarios in which multiple secondary devices may be available around the user, sounds/audio signals from the surrounding environment or physical space can be detected not only by the target secondary device, but also a secondary device belonging to someone else. As discussed earlier, in different embodiments, the access management system can, in response to the user's request for access, cause playback of a randomly generated audio signal 792 via onboard speakers 790 for client device 732. A microphone for the mobile device 748 can detect and capture any audio data 794 for verification app 736A. However, at the same time or nearly at the same time, the audio data 794 is also detected at the nearby devices and captured by the verification app 736B. Both instances of the app then transmit their confirmation messages to the remote server over network 752. Based on the receipt of more than one confirmation message, the remote access management system determines that among the computing devices near to the client device 732 is another device running the app 736B. In response to this determination, the system can automatically disable 754 the use of the audio signal-based authentication process. In this case, the system presents instructions 738 via the client device 732 ("Multiple signals detected/Please select an alternate authentication process") to alert the third user 730. In some embodiments, a set of multiple-choice options of alternate authentication techniques can be presented to the user to allow them to proceed (e.g., facial recognition, voice recognition, fingerprint recognition, password or pin-code verification, or other such factors).

FIG. 8 is a flow chart illustrating an embodiment of a method 800 of authenticating a user seeking access to secured resources. The method 800 includes a first step 810 of receiving, at a cloud-based authentication system and from a first user via a first computing device, a request to access a secured resource linked to a first user identity. The method 800 also includes a second step 820 of transmitting, from the authentication system and in response to the request, a first audio control signal to the first computing device, the first audio control signal causing the first computing device to perform playback of first audio data via speakers of the first computing device. A third step 830 includes receiving, at the authentication system, a confirmation message from a second computing device within audio sensor range of the first computing device, the confirmation message indicating the first audio data was detected by a microphone of the second computing device. Furthermore, a fourth step 840 includes determining, in response to the receiving the confirmation message, that the first user has the first user identity. Finally, a fifth step 850 includes thereby granting access to the first user to the secured resource at the first computing device.

In other embodiments, the method may include additional steps or aspects. In some embodiments, the method also includes a step of receiving, from the first computing device and at the authentication system, a speaker status message indicating that the speakers of the first computing device are operational and activated, and transmission of the first audio control signal is further in response to receiving the speaker status message. In one example, the first audio control signal includes a first audio pattern, and the method further includes determining that the first audio data includes a representation of the first audio pattern. In some embodiments, the second computing device includes a verification software application associated with the authentication system, and the method further includes transmitting, via the verification application, a recording of the first audio data to the authentication system. In one embodiment, the first audio data is emitted at frequencies outside of the human hearing range. In some embodiments, the secured resource includes one of a service, feature, and information for which access is restricted to one or more authorized persons. In different embodiments, the second computing device includes a verification software application associated with the authentication system, and the second computing device is the only other computing device on which the verification software application is installed that is within audio sensor range of the first computing device. In one embodiment, the first computing device is a desktop or laptop computer and the second computing device is a mobile smartphone.

Other methods may be contemplated within the scope of the present disclosure. For example, in some embodiments, a method of precluding attempts by persons to fraudulently obtain access to secure user data is disclosed. The method includes a first step of receiving, at a cloud-based authentication system and from a first user via a first computing device, a request to access a secured resource linked to a first user identity, thereby triggering a first authentication process, and a second step of transmitting, from the authentication system and in response to the request, a first audio control signal to the first computing device, the first audio control signal causing the first computing device to perform playback of first audio data via speakers of the first computing device. The method can include a third step of receiving, at the authentication system, a first confirmation message from a second computing device within audio sensor range of the first computing device, the first confirmation message indicating the first audio data was detected by a first microphone of the second computing device, and a fourth step of receiving, at the authentication system, a second confirmation message from a third computing device within audio sensor range of the first computing device, the second confirmation message indicating the first audio data was detected by a second microphone of the third computing device. A fifth step includes determining, in response to the receiving more than one confirmation message at the authentication system, that an alternate authentication process must be employed to verify whether the first user has the first user identity, and a sixth step includes requiring, at the first computing device, that the first user either move to a private space or present a non-audio-based authentication token in order to access the secured resource via the first computing device.

In such embodiments, the method may include additional steps or aspects. In some embodiments, the method also includes a step of receiving, from the first computing device and at the authentication system, a speaker status message indicating that the speakers of the first computing device are operational and activated, and the transmission of the first audio control signal is further in response to receiving the speaker status message. In one example, the second computing device includes a verification software application associated with the authentication system, and the second computing device is the only other computing device on which the verification software application is installed that is within audio sensor range of the first computing device. In different embodiments, the first computing device is a desktop or laptop computer and the second computing device is a mobile smartphone.

It is to be appreciated that methods in accordance with the present disclosure can include any combination of the aspects and features described herein. That is, methods and systems in accordance with the present disclosure are not limited to the combinations of aspects and features specifically described herein, but also include any combination of the aspects and features provided.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

The computing devices and systems described herein may include one or more processors, a memory, one or more storage devices, and one or more input/output (I/O) devices controllable via one or more I/O interfaces. The various components may be interconnected via at least one system bus, which may enable the transfer of data between the various modules and components of the system.

The processor(s) may be configured to process instructions for execution within the system. The processor(s) may include single-threaded processor(s), multi-threaded processor(s), or both. The processor(s) may be configured to process instructions stored in the memory or on the storage device(s). The processor(s) may include hardware-based processor(s) each including one or more cores. The processor(s) may include general purpose processor(s), special purpose processor(s), or both. The memory may store information within the system. In some implementations, the memory includes one or more computer-readable media. The memory may include any number of volatile memory units, any number of non-volatile memory units, or both volatile and non-volatile memory units. The memory may include read-only memory, random access memory, or both. In some examples, the memory may be employed as active or physical memory by one or more executing software modules.

The storage device(s) may be configured to provide (e.g., persistent) mass storage for the system. In some implementations, the storage device(s) may include one or more computer-readable media. For example, the storage device(s) may include a floppy disk device, a hard disk device, an optical disk device, or a tape device. The storage device(s) may include read-only memory, random access memory, or both. The storage device(s) may include one or more of an internal hard drive, an external hard drive, or a removable drive.

One or both of the memory or the storage device(s) may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system. In some implementations, the CRSM may include a data store that provides storage of computer-readable instructions or other information in a non-transitory format. The CRSM may be incorporated into the system or may be external with respect to the system. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) and the memory may be supplemented by, or incorporated into, one or more application-specific integrated circuits (ASICs).

The system may include one or more I/O devices. The I/O device(s) may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) may also include one or more output devices such as a display, LED(s), an audio output device (e.g., a speaker), a printer, a haptic output device, and so forth. The I/O device(s) may be physically incorporated in one or more computing devices of the system, or may be external with respect to one or more computing devices of the system.

The system may include one or more I/O interfaces to enable components or modules of the system to control, interface with, or otherwise communicate with the I/O device(s). The I/O interface(s) may enable information to be transferred in or out of the system, or between components of the system, through serial communication, parallel communication, or other types of communication. For example, the I/O interface(s) may comply with a version of the RS-232 standard for serial ports, or with a version of the IEEE 1284 standard for parallel ports. As another example, the I/O interface(s) may be configured to provide a connection over Universal Serial Bus (USB) or Ethernet. In some examples, the I/O interface(s) may be configured to provide a serial connection that is compliant with a version of the IEEE 1394 standard. The I/O interface(s) may also include one or more network interfaces that enable communications between computing devices in the system, or between the system and other network-connected computing systems. The network interface(s) may include one or more network interface controllers (NICs) or other types of transceiver devices configured to send and receive communications over one or more networks, such as the network(s), using any network protocol.

Computing devices of the system may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a GPS receiver, to name just a few. Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical user interface or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet. The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A computer-implemented method of authenticating a user seeking access to secured resources, the method comprising:

receiving, at a cloud-based authentication system and from a first user via a first computing device, a request to access a secured resource linked to a first user identity;

transmitting, from the authentication system and in response to the request, a first audio control signal to the first computing device, the first audio control signal causing the first computing device to perform playback of first audio data via speakers of the first computing device;

receiving, at the authentication system, a confirmation message from a second computing device within audio sensor range of the first computing device, the confirmation message indicating the first audio data was detected by a microphone of the second computing device;

determining, in response to the receiving the confirmation message, that the first user has the first user identity; and thereby granting access to the first user to the secured resource at the first computing device.

2. The method of claim 1, further comprising receiving, from the first computing device and at the authentication system, a speaker status message indicating that the speakers of the first computing device are operational and activated, wherein transmission of the first audio control signal is further in response to receiving the speaker status message.

3. The method of claim 1, wherein the first audio control signal includes a first audio pattern, and the method further comprises determining that the first audio data includes a representation of the first audio pattern.

4. The method of claim 1, wherein the second computing device includes a verification software application associated with the authentication system, and the method further comprises transmitting, via the verification application, a recording of the first audio data to the authentication system.

5. The method of claim 1, wherein the first audio data is emitted at frequencies outside of the human hearing range.

6. The method of claim 1, wherein the secured resource includes one of a service, feature, and information for which access is restricted to one or more authorized persons.

7. The method of claim 1, wherein the second computing device includes a verification software application associated with the authentication system, and the second computing device is the only other computing device on which the verification software application is installed that is within audio sensor range of the first computing device.

8. The method of claim 1, wherein the first computing device is a desktop or laptop computer and the second computing device is a mobile smartphone.

9. A computer-implemented method of precluding attempts by persons to fraudulently obtain access to secure user data, the method comprising:

receiving, at a cloud-based authentication system and from a first user via a first computing device, a request to access a secured resource linked to a first user identity, thereby triggering a first authentication process;

transmitting, from the authentication system and in response to the request, a first audio control signal to the first computing device, the first audio control signal causing the first computing device to perform playback of first audio data via speakers of the first computing device;

receiving, at the authentication system, a first confirmation message from a second computing device within audio sensor range of the first computing device, the first confirmation message indicating the first audio data was detected by a first microphone of the second computing device;

receiving, at the authentication system, a second confirmation message from a third computing device within audio sensor range of the first computing device, the second confirmation message indicating the first audio data was detected by a second microphone of the third computing device;

determining, in response to the receiving more than one confirmation message at the authentication system, that an alternate authentication process must be employed to verify whether the first user has the first user identity; and requiring, at the first computing device, that the first user either move to a private space or present a non-audio-based authentication token in order to access the secured resource via the first computing device.

10. The method of claim 9, further comprising receiving, from the first computing device and at the authentication system, a speaker status message indicating that the speakers of the first computing device are operational and activated, wherein transmission of the first audio control signal is further in response to receiving the speaker status message.

11. The method of claim 9, wherein the first audio data is emitted at frequencies outside of the human hearing range.

12. The method of claim 9, wherein the secured resource includes one of a service, feature, and information for which access is restricted to one or more authorized persons.

13. A system for authenticating a user seeking access to secured resources, the system comprising a processor and machine-readable media including instructions which, when executed by the processor, cause the processor to:

receive, at a cloud-based authentication system and from a first user via a first computing device, a request to access a secured resource linked to a first user identity;

transmit, from the authentication system and in response to the request, a first audio control signal to the first computing device, the first audio control signal causing the first computing device to perform playback of first audio data via speakers of the first computing device;

receive, at the authentication system, a confirmation message from a second computing device within audio sensor range of the first computing device, the confirmation message indicating the first audio data was detected by a microphone of the second computing device;

determine, in response to the receiving the confirmation message, that the first user has the first user identity; and thereby grant access to the first user to the secured resource at the first computing device.

14. The system of claim 13, wherein the instructions further cause the processor to receive, from the first computing device and at the authentication system, a speaker status message indicating that the speakers of the first computing device are operational and activated, wherein transmission of the first audio control signal is further in response to receiving the speaker status message.

15. The system of claim 13, wherein the first audio control signal includes a first audio pattern, and the method further comprises determining that the first audio data includes a representation of the first audio pattern.

16. The system of claim 13, wherein the second computing device includes a verification software application associated with the authentication system, and the instructions further cause the processor to transmit, via the verification application, a recording of the first audio data to the authentication system.

17. The system of claim 13, wherein the first audio data is emitted at frequencies outside of the human hearing range.

18. The system of claim 13, wherein the secured resource includes one of a service, feature, and information for which access is restricted to one or more authorized persons.

19. The system of claim 13, wherein the second computing device includes a verification software application associated with the authentication system, and the second computing device is the only other computing device on which the verification software application is installed that is within audio sensor range of the first computing device.

20. The system of claim 13, wherein the first computing device is a desktop or laptop computer and the second computing device is a mobile smartphone.

* * * * *